US012652107B2

(12) United States Patent
Kaneko et al.

(10) Patent No.: US 12,652,107 B2
(45) Date of Patent: Jun. 9, 2026

(54) OPTICAL TRANSMISSION MODULE AND OPTICAL MODULE

(71) Applicant: NEC Corporation, Tokyo (JP)

(72) Inventors: Taro Kaneko, Tokyo (JP); Shigeru Mieda, Tokyo (JP); Masaki Oe, Tokyo (JP); Yuuji Minota, Tokyo (JP); Naoki Kobayashi, Tokyo (JP); Rintaro Nomura, Tokyo (JP); Kimiyoshi Fukatsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 269 days.

(21) Appl. No.: 18/697,806

(22) PCT Filed: Nov. 15, 2021

(86) PCT No.: PCT/JP2021/041820
§ 371 (c)(1),
(2) Date: Apr. 2, 2024

(87) PCT Pub. No.: WO2023/084762
PCT Pub. Date: May 19, 2023

(65) Prior Publication Data
US 2025/0007613 A1 Jan. 2, 2025

(51) Int. Cl.
*H04B 10/40* (2013.01)
*G02B 6/42* (2006.01)

(52) U.S. Cl.
CPC ........... *H04B 10/40* (2013.01); *G02B 6/4201* (2013.01)

(58) Field of Classification Search
CPC ... H04B 1/02; H04B 1/06; H04B 1/38; H04B 1/62; H04B 1/69; H04B 13/02;
(Continued)

(56) References Cited

U.S. PATENT DOCUMENTS 7,027,674 B2 * 4/2006 Matsushima ........ G02B 6/4201
385/129
11,316,589 B2 * 4/2022 Park .................... H04J 14/0258
(Continued)

FOREIGN PATENT DOCUMENTS

DE 102009021010 B4 * 3/2012 .......... H04J 14/0305
JP H11186668 A * 7/1999
(Continued)

OTHER PUBLICATIONS

Tilo Meister et al.,"Flexible Electronics for Wireless Communication: a Technology and Circuit Design Review With an Application Example," Mar. 2, 2022, IEEE Microwave Magazine ( vol. 23, Issue: 4, Apr. 2022), pp. 24-41.*
(Continued)

*Primary Examiner* — Omar S Ismail
(74) *Attorney, Agent, or Firm* — .Sughrue Mion, PLLC

(57) ABSTRACT
The optical transmission module provided is designed to be simpler, smaller, and faster. It consists of a housing that holds one or more stacked substrates, partially exposed. Inside the housing, there is a light emitter that generates optical signals and an optical functional element that processes the transmission signal for driving the light emitter. Multiple terminals extend from the inside to the outside of the housing on the substrates. The terminals are divided into two groups: the first group connects to electrodes of a high-frequency circuit in the optical functional element, and the second group connects to electrodes of a low-frequency circuit. The length between the upper surfaces of the first group terminals and the high-frequency circuit electrodes is shorter than the length between the upper surfaces of the second group terminals and the low-frequency circuit electrodes, in the direction perpendicular to the substrates' major surface.

9 Claims, 13 Drawing Sheets

1000 OPTICAL TRANSMISSION MODULE
1400 LIGHT EMITTING UNIT
1320
1310 HIGH-FREQUENCY CIRCUIT
1600 WIRE
1130b SECOND INTERNAL TERMINAL
1100a FIRST SUBSTRATE
1200 HOUSING
1130b 1100b 1130b
1210 WINDOW
1110 TERMINAL
A A'
1100 SUBSTRATE
1100b SECOND SUBSTRATE
1700 TEMPERATURE ADJUSTMENT ELEMENT
1100b 1400
1320 LOW-FREQUENCY CIRCUIT
1500 OPTICAL MULTIPLEXER
1300 OPTICAL FUNCTIONAL ELEMENT
1120 EXTERNAL TERMINAL
1130a FIRST INTERNAL TERMINAL

(58) Field of Classification Search
CPC ........ H04B 10/80; H04B 10/60; H04B 10/50;
H04B 10/40; H04B 10/29; H04B 10/27;
H04B 10/25; H04B 10/11; H04B 10/07;
H04B 10/03; H04B 7/24; H04B 7/14;
H04B 7/02; H04B 5/70; H04B 5/40;
H04B 5/20; H04B 17/30; H04B 17/20;
H04B 17/10; H04B 15/02; H04B 14/02;
H04B 14/08; H04B 3/54; H04B 3/02
See application file for complete search history.

(56) References Cited

U.S. PATENT DOCUMENTS

| | | | | |
|---|---|---|---|---|
| 11,764,892 | B2 * | 9/2023 | Park | H04J 14/0241 |
| | | | | 398/79 |
| 2001/0055450 | A1 * | 12/2001 | Kawamoto | G02B 6/4206 |
| | | | | 385/88 |
| 2005/0213979 | A1 * | 9/2005 | Nakashima | H04B 10/2589 |
| | | | | 398/79 |
| 2007/0274642 | A1 * | 11/2007 | Inujima | G02B 6/4202 |
| | | | | 385/88 |
| 2008/0240717 | A1 * | 10/2008 | Izumi | H04B 10/40 |
| | | | | 398/79 |
| 2010/0219410 | A1 * | 9/2010 | Godo | H10D 30/6704 |
| | | | | 257/E29.094 |
| 2010/0244031 | A1 * | 9/2010 | Akimoto | H10D 64/62 |
| | | | | 257/E21.414 |
| 2012/0132855 | A1 * | 5/2012 | Ishitani | C09K 19/588 |
| | | | | 252/299.6 |
| 2018/0041006 | A1 * | 2/2018 | Blauvelt | H01S 5/042 |
| 2019/0163028 | A1 * | 5/2019 | Miyazaki | H04B 10/5161 |
| 2019/0204515 | A1 * | 7/2019 | Miyazaki | G02B 6/4266 |
| 2020/0386941 | A1 * | 12/2020 | Kang | G02B 6/4246 |
| 2022/0386935 | A1 * | 12/2022 | Lo | A61B 5/389 |
| 2022/0406972 | A1 * | 12/2022 | Im | H10H 20/8316 |

FOREIGN PATENT DOCUMENTS

| | | | | |
|---|---|---|---|---|
| JP | 2005-236298 A | | 9/2005 | |
| JP | 2019140240 A | * | 8/2019 | G02B 27/62 |
| TW | 1802061 B | * | 5/2023 | G02B 6/4214 |
| WO | WO-2011113316 A1 | * | 9/2011 | H04Q 11/0067 |

OTHER PUBLICATIONS

Holger Karstensen et al.,"Module Packaging for High-speed Serial and Parallel Transmission," Aug. 6, 2022, 2000 Proceedings. 50th Electronic Components and Technology Conference (Cat. No.00CH37070), pp. 479-485.*
International Search Report for PCT Application No. PCT/JP2021/041820, mailed on Feb. 8, 2022.
English translation of Written opinion for PCT Application No. PCT/JP2021/041820, mailed on Feb. 8, 2022.

\* cited by examiner

1 OPTICAL TRANSCEIVER

3 CONNECTOR          2 HOUSING

Fig.2

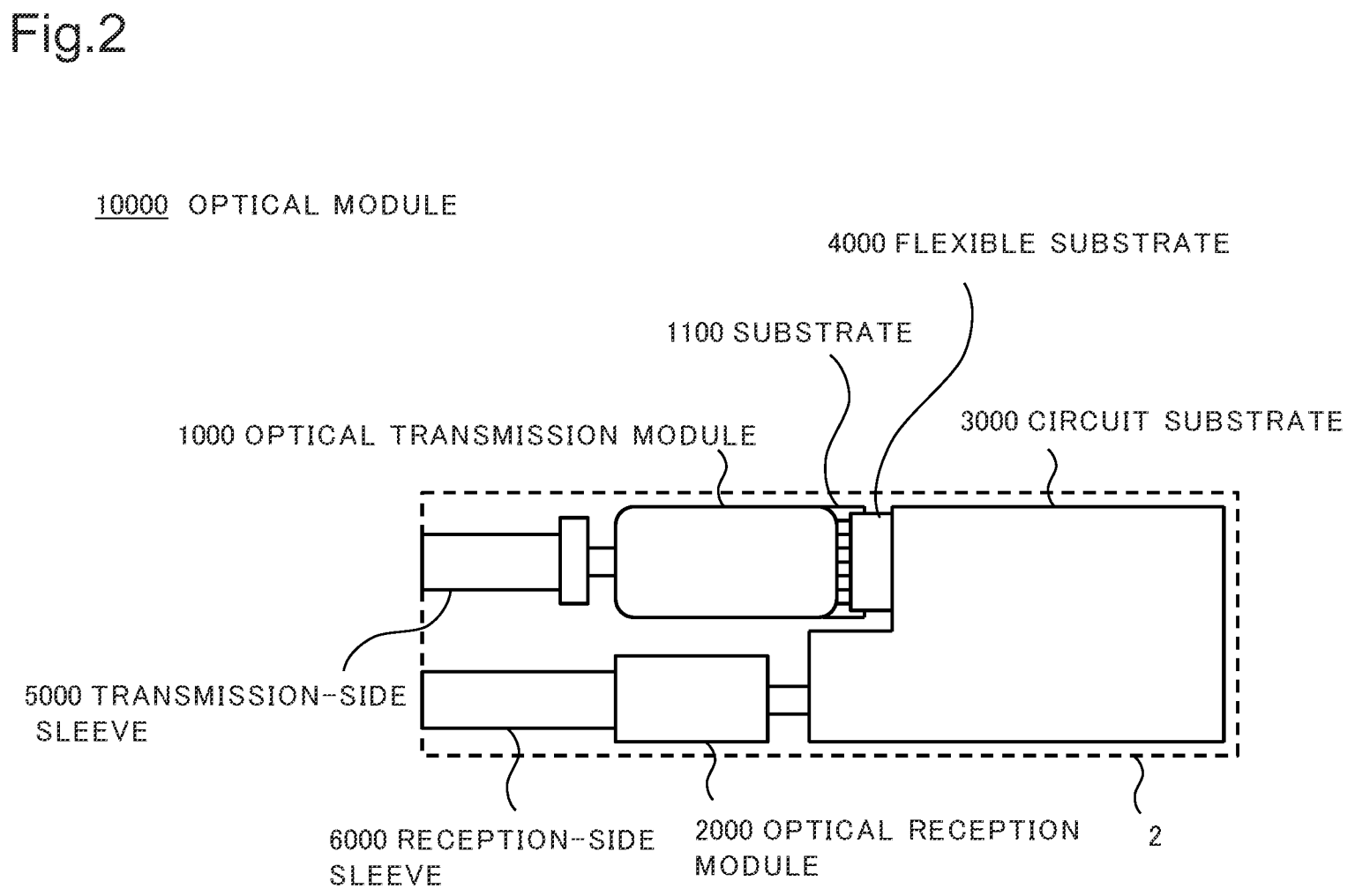

10000 OPTICAL MODULE

1000 OPTICAL TRANSMISSION MODULE

1100 SUBSTRATE

4000 FLEXIBLE SUBSTRATE

3000 CIRCUIT SUBSTRATE

5000 TRANSMISSION-SIDE SLEEVE

6000 RECEPTION-SIDE SLEEVE

2000 OPTICAL RECEPTION MODULE

2

1000

1200 HOUSING

1130

1120

1100b

1100a

1001 OPTICAL TRANSMISSION MODULE

1100

1140 CONCAVE PORTION

1200

1300

1400

1500

1700

1300

1440

1450

1410

1420

1700

1710 HEAT TRANSFTER PLATE

Fig. 10

OPTICAL TRANSMISSION MODULE AND OPTICAL MODULE

This application is a National Stage Entry of PCT/JP2021/041820 filed on Nov. 15, 2021, the contents of all of which are incorporated herein by reference, in their entirety.

TECHNICAL FIELD

The present invention relates to an optical transmission module and the like.

BACKGROUND ART

Recently, performance enhancement of an optical module being used in an optical communication system is advancing. With the performance enhancement, size reduction of an optical module and acceleration of transmission speed are required. Such size reduction and acceleration need to be achieved by satisfying various types of specifications. Therefore, a technique for achieving size reduction and capacity enhancement of an optical module while satisfying a specification has been studied.

PTL 1, for example, discloses a technique for reducing a height of an optical module while ensuring optical coupling between an optical semiconductor element and an optical component. The optical module includes an optical semiconductor element having a first optical axis and an optical component having a second optical axis, in which a height of the first optical axis from a bottom surface is higher than a height of the second optical axis and an optical axis adjustment unit that compensates the height of the first optical axis and the height of the second optical axis is provided on a side wall. With such a configuration, height reduction of the optical module is achieved while optical coupling between the optical semiconductor element and the optical component is ensured.

CITATION LIST

Patent Literature

PTL 1: Japanese Unexamined Patent Application Publication No. 2019-140240

SUMMARY OF INVENTION

Technical Problem

In the technique described in PTL 1, there is a problem that, while height reduction of an optical module is achieved, a structure is complex since the optical axis adjustment unit is provided.

An object of the present invention is to provide an optical transmission module and the like in which a structure is simpler and response to size reduction and acceleration is made possible.

Solution to Problem

An optical transmission module according to the present invention includes: a housing: one or more substrates that are laminated and housed inside the housing in such a way as to be partially exposed: a light emitting unit that is housed in the housing and generates an optical signal: an optical functional element that is housed in the housing and executes signal processing on a transmission signal for driving the light emitting unit: a plurality of terminals provided on the one or more substrates in such a way as to extend between an outside and an inside of the housing: a plurality of external terminals disposed outside the housing from among a plurality of the terminals; and a plurality of internal terminals disposed inside the housing from among a plurality of the terminals, in which a first group of a plurality of the internal terminals is a first internal terminal connected to an electrode of a high-frequency circuit of the optical functional element, a second group of a plurality of the internal terminals is a second internal terminal connected to an electrode of a low-frequency circuit of the optical functional element, and, in a direction perpendicular to a major surface of the one or more substrates, a length between an upper surface of the electrode of the high-frequency circuit and an upper surface of the first internal terminal is less than a length between an upper surface of the electrode of the low-frequency circuit and an upper surface of the second internal terminal.

Advantageous Effects of Invention

According to the present invention, an optical transmission module and the like in which a structure is simpler and response to size reduction and acceleration is made possible are able to be provided.

BRIEF DESCRIPTION OF DRAWINGS

FIG. 2 is a plane schematic diagram illustrating a configuration example of an optical module including an optical transmission module according to the first example embodiment of the present invention.

FIG. 10 is a side schematic diagram illustrating a configuration example of an optical module according to a fifth example embodiment of the present invention.

EXAMPLE EMBODIMENT

Hereinafter, with reference to the accompanying drawings, example embodiments according to the present invention are described in detail. However, according to the example embodiments described below, a technically-preferable limitation is made in order to implement the present invention but the scope of the invention is not limited to the following. Note that a similar component in drawings is assigned with the same number and description thereof may be omitted.

First Example Embodiment

Figure 1:
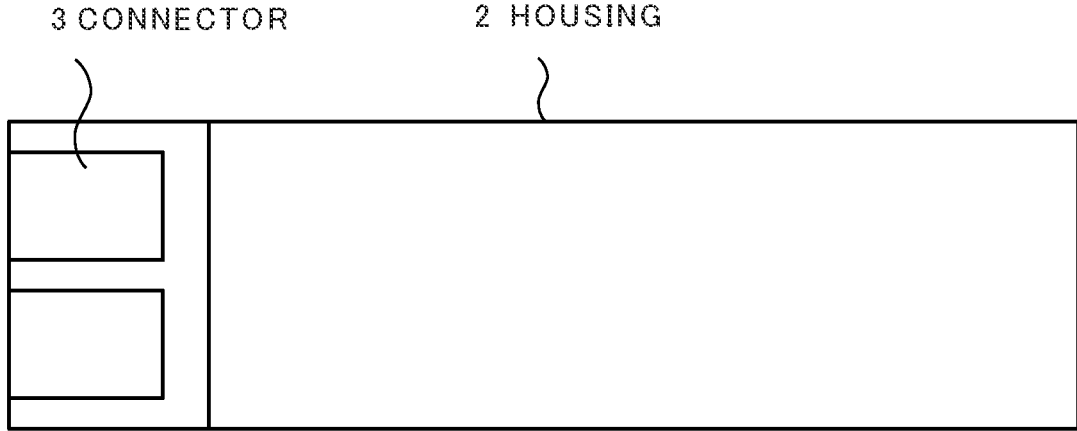
FIG. 1 is a schematic diagram illustrating an outline of an optical transceiver being one example of a device applied with an optical module according to a first example embodiment of the present invention.
Figure 3:
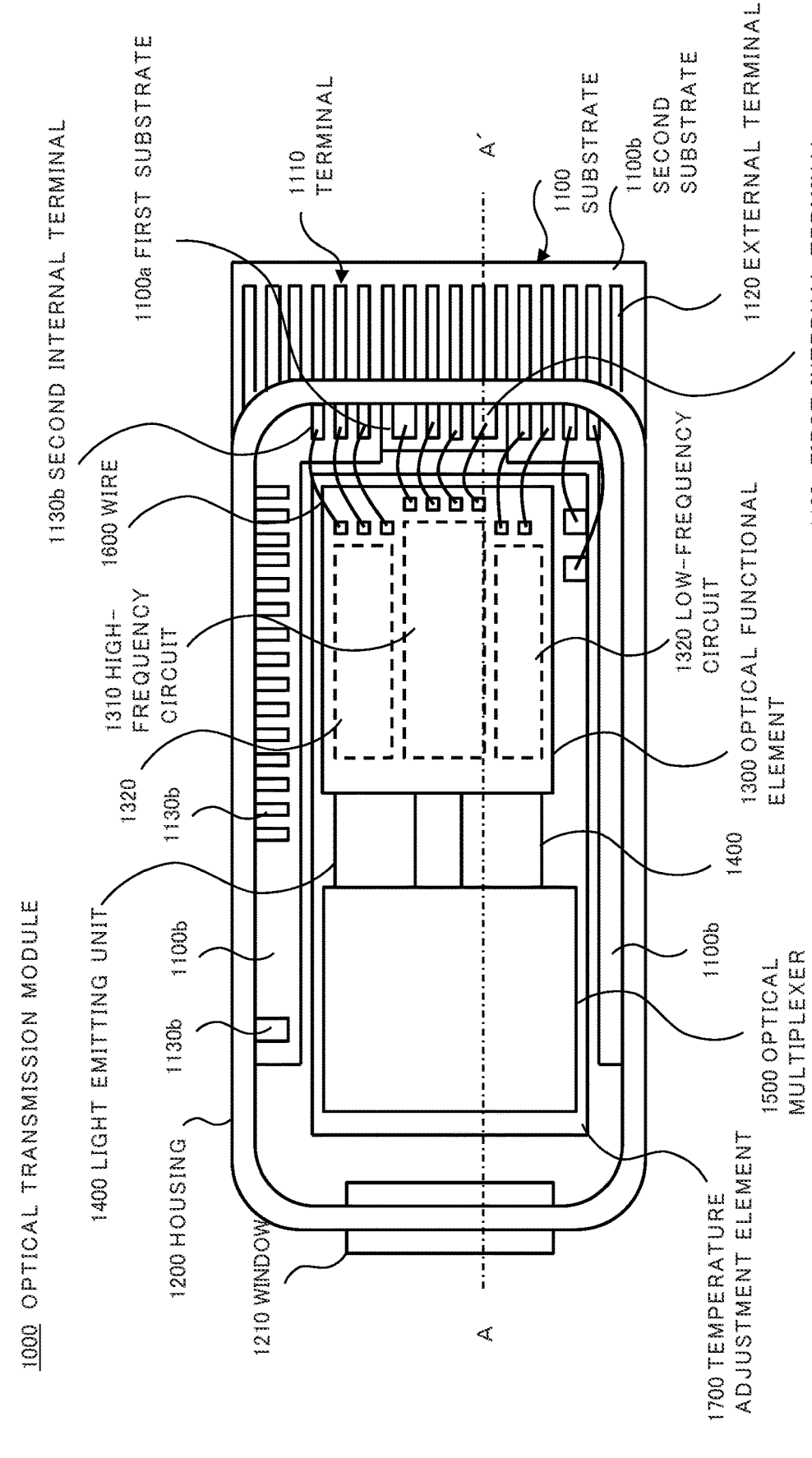
FIG. 3 is a plane schematic diagram illustrating one example of the optical transmission module according to the first example embodiment of the present invention.

FIG. 1 is a schematic diagram illustrating an outline of an optical transceiver being one example of a device applied with an optical module according to a first example embodiment of the present invention. FIG. 2 is a plane schematic diagram illustrating a configuration example of an optical module according to the first example embodiment of the present invention. FIG. 3 is a plane schematic diagram illustrating a configuration example of an optical transmission module 1000 included in an optical module 10000.

As illustrated in FIG. 1, an optical transceiver 1 includes a housing 2 housing the optical module 10000 and a connector 3 connected to an optical line. While not illustrated, on an opposite side of the connector 3 of the housing 2, a connector for electrically connecting the optical transceiver 1 to an electronic device is disposed.

FIG. 2 is a plane schematic diagram illustrating a configuration example of the optical module 10000 according to the first example embodiment of the present invention. The optical module 10000 includes an optical transmission module 1000, an optical reception module 2000, a circuit substrate 3000, and a flexible substrate 4000. Herein, the flexible substrate 4000 is also referred to as a flexible printed circuit (FPC). The optical module 10000 may be provided with a transmission-side sleeve 5000 connected to an emission side of the optical transmission module 1000 and a reception-side sleeve 6000 connected to a connector of an optical incidence side of the optical reception module 2000.

From one end of the optical transmission module 1000, a substrate 1100 is protruded, and the flexible substrate 4000 electrically connects a terminal 1110 and a circuit substrate 3000. While not illustrated, the optical reception module 2000 is also electrically connected to the circuit substrate 3000.

Figure 4:
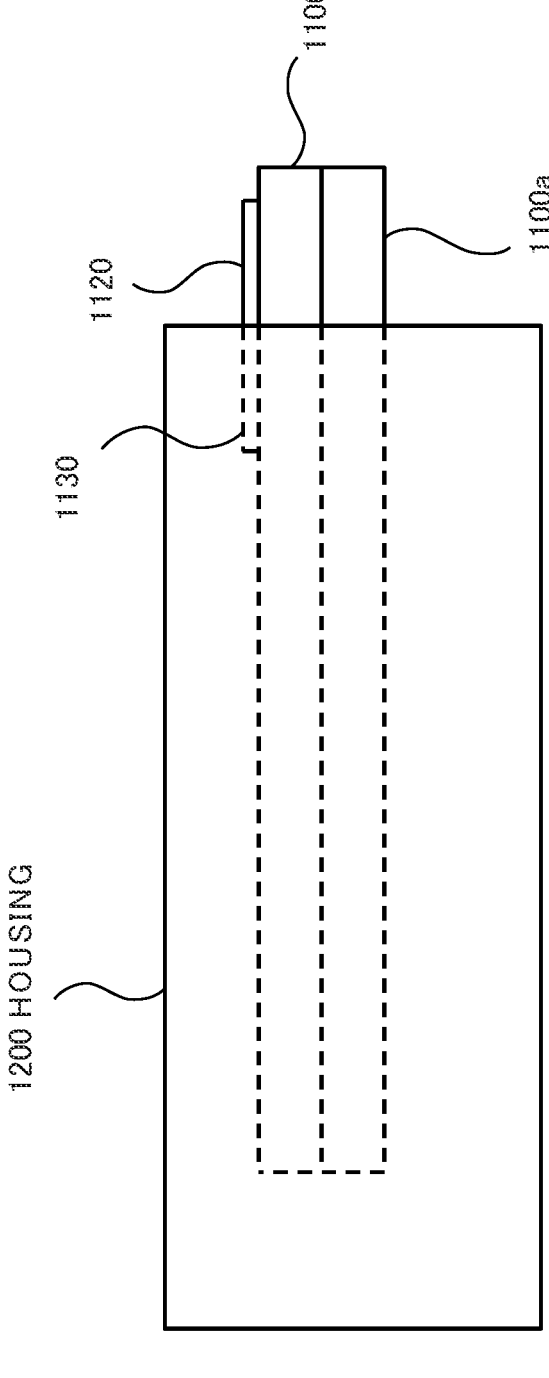
FIG. 4 is a side schematic diagram illustrating one example of the optical transmission module according to the first example embodiment of the present invention.

FIG. 3 is a plane schematic diagram illustrating a configuration example of the optical transmission module 1000. It is noted that an upper surface of the optical transmission module 1000 is covered with a lid during use, but in FIG. 3, the upper surface is illustrated in a state without a lid. FIG. 4 is a side schematic diagram illustrating one example of the optical transmission module according to the first example embodiment of the present invention.

The optical transmission module 1000 includes the substrate 1100, a housing 1200, an optical functional element 1300, a light emitting unit 1400, an optical multiplexer 1500, a temperature adjustment element 1700, and a plurality of the terminals 1110. The optical multiplexer 1500 and the temperature adjustment element 1700 are not necessarily included according to the present invention.

As illustrated in FIGS. 3 and 4, the substrate 1100 is housed inside the housing 1200 in such a way as to be partially exposed. On the substrate 1100, the plurality of terminals 1110 are formed. The substrate 1100 is inserted inside the housing 1200 from one side surface of the housing 1200.

In the examples of FIGS. 3 and 4, the substrate 1100 is a laminated body of a first substrate 1100$a$ and a second substrate 1100$b$. When the first substrate 1100$a$ and the second substrate 1100$b$ have plane shapes different from each other, flat portions having heights different from each other in a direction perpendicular to a surface of the substrate 1100 are formed. Herein, the first substrate 1100$a$ and the second substrate 1100$b$ are relevant to one or more substrates. In other words, the first substrate 1100$a$ and the second substrate 1100$b$ are laminated and housed inside the housing 1200 in such a way as to be partially exposed.

A part (the second substrate 1100$b$ in FIG. 5) of the substrate 1100 disposed inside the housing 1200 is formed along an inside surface of the housing 1200. In other words, a part of the substrate 1100 disposed inside the housing 1200 is formed, as a general rule, into a "KO" shape of katakana (or an alphabet C shape) in which a central portion is hollowed in order to ensure a space for internally housing an element and the like.

The housing 1200 is formed into a box shape. The housing 1200 houses an electronic component such as the optical functional element 1300, the light emitting unit 1400, and the optical multiplexer 1500 and houses a part of the first substrate 1100$a$ and the second substrate 1100$b$. As a material of the housing 1200, for example, kovar alloy is used, and for a surface where disposed with an optical module, Cu alloy having excellent thermal conductivity, for example, such as CuW and CuMo alloy is used.

The optical functional element 1300 is housed inside the housing 1200. The optical functional element 1300 includes a function of controlling an oscillation wavelength and an optical modulation function of modulating an optical signal. The optical transmission module 1000 performs, for example, by using the optical functional element 1300 and the light emitting unit 1400, laser oscillation in a predetermined wavelength, based on a control signal input from the terminal 1110, inputs a high-frequency signal from an outside of a housing via the terminal 1110, modulates laser light, and converts the modulated laser light into an optical modulation signal. In the operation, a loss due to a modulator may be caused. Therefore, in the example of FIG. 3, two light emitting units 1400 are provided and, for example, a loss due to a modulator function is compensated, and thereby optical output can be maintained in a predetermined range. As a specific example of the optical functional element 1300, for example, a silicon photonics element in which on a silicon substrate, functions such as an optical waveguide, an optical modulator, and an optical reception element are integrated is available.

The optical multiplexer 1500 is housed inside the housing 1200. The optical multiplexer 1500 multiplexes a plurality of light beams emitted from a plurality of blocks of the light emitting unit 1400 and emits the multiplexed light toward a window 1210.

The temperature adjustment element 1700 is provided on a bottom surface side of the optical functional element 1300 and the light emitting unit 1400. The temperature adjustment element is, for example, a thermoelectric element generally referred to as a thermos-electric cooler (TEC) and includes an element, for example, a Peltier element in which temperature is controlled based on an electric operation. Based on the operation, the temperature adjustment element 1700 adjusts temperatures of the optical functional element 1300 and the light emitting unit 1400.

The plurality of terminals 1110 are provided on the first substrate 1100a and the second substrate 1100b in such a way as to extend between an outside and an inside of the housing 1200. It is assumed that in the plurality of terminals 1110, a portion present outside the housing 1200 is referred to as an external terminal 1120 and a portion present inside the housing 1200 is referred to as an internal terminal 1130. In other words, among the plurality of terminals 1110, a plurality of the external terminals 1120 are disposed outside of the housing 1200. A plurality of the internal terminals 1130 are disposed inside the housing 1200 among the plurality of terminals 1110.

The internal terminal 1130 and a component such as the optical functional element 1300 and the light emitting unit 1400 can be connected, for example, by a wire 1600. The internal terminal 1130 is divided into a first internal terminal 1130a being a first group connected to the high-frequency circuit 1310 and a second internal terminal 1130b being a second group connected to the low-frequency circuit 1320. In other words, a first group of a plurality of internal terminals 1130 is the first internal terminal 1130a connected to an electrode of the high-frequency circuit 1310 of the optical functional element. A second group of the plurality of internal terminals 1130 is the second internal terminal 1130b connected to an electrode of the low-frequency circuit 1320 of the optical functional element. In the following description, a high frequency may be referred to as a radio frequency (RF).

Figure 5:
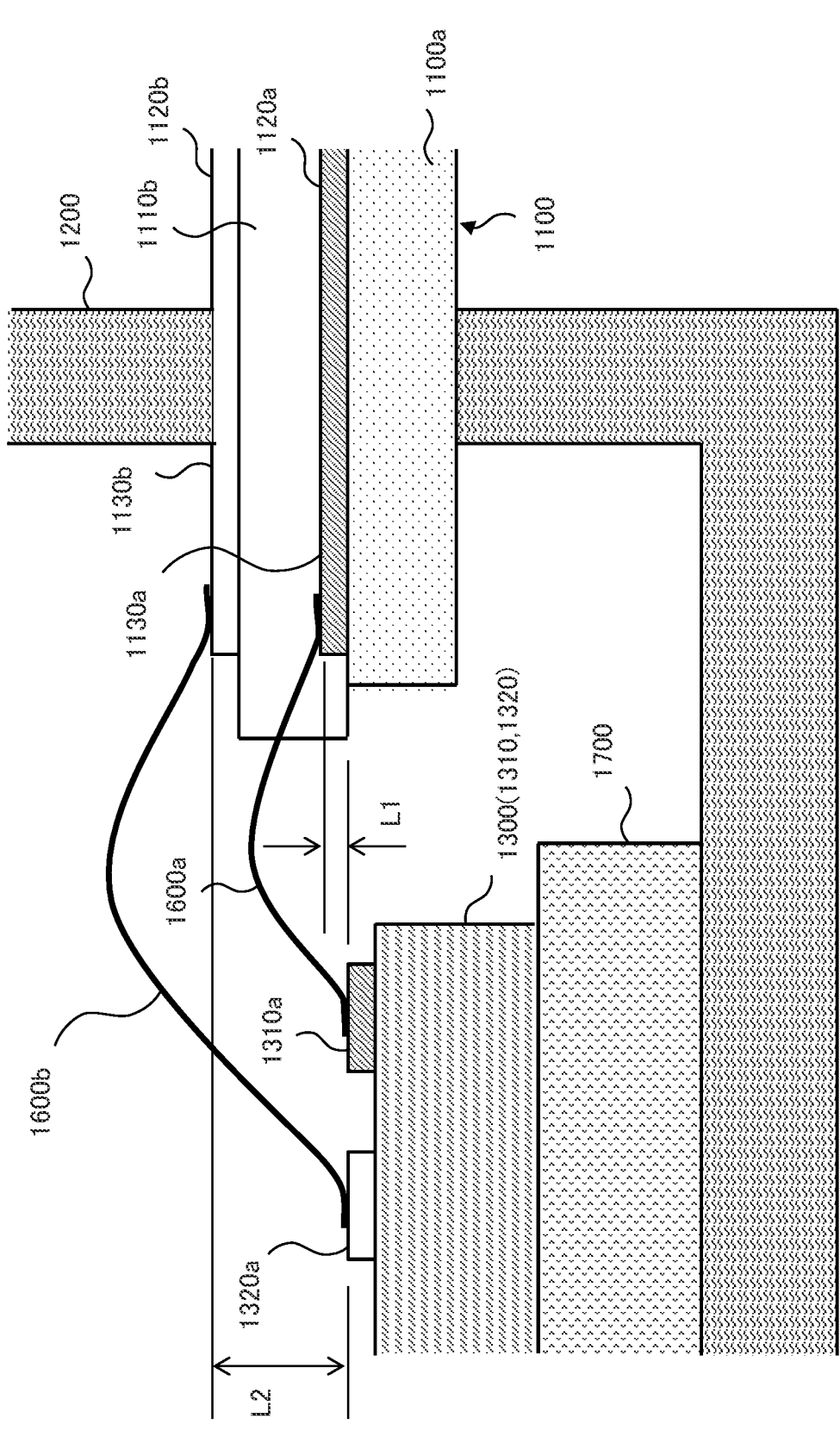
FIG. 5 is a cross-sectional diagram illustrating one example of a connection structure of the optical transmission module according to the first example embodiment of the present invention.

FIG. 5 is a cross-sectional diagram illustrating one example of a connection structure of the optical transmission module according to the first example embodiment of the present invention. FIG. 5 illustrates a connection portion based on the wire 1600 in a cross section in A-A' of FIG. 3. In the optical transmission module 1000, the first internal terminal 1130a and an electrode of the high-frequency circuit 1310 are connected by the wire 1600, and the second internal terminal 1130b and an electrode of the low-frequency circuit 1320 are connected by the wire 1600. The first internal terminal 1130a is disposed on the first substrate 1100a, and the second internal terminal 1130b is disposed on the second substrate 1100b.

As illustrated in FIG. 5, in a direction perpendicular to a major surface of the substrate 1100, a length between an upper surface of an electrode 1310a of the high-frequency circuit 1310 and an upper surface of the first internal terminal 1130a is L1. A length between an upper surface of an electrode 1320a of the low-frequency circuit 1320 and an upper surface of the second internal terminal 1130b is L2. The L1 is smaller than the L2. The L1 may be zero. In other words, the upper surface of the electrode of the high-frequency circuit 1310 and the first internal terminal 1130a may be disposed to be flush with a major surface of the substrate 1100 in a perpendicular direction.

As described above, the reason why the length L2 between the upper surface of the electrode of the low-frequency circuit 1320 and the second internal terminal 1130b is increased is to increase a thermal resistance between the both. When the L2 is increased, the wire 1600 connecting the electrode of the low-frequency circuit 1320 and the second internal terminal 1130b can be increased. The reason why such a configuration is made is that it is difficult for a temperature of an environment where the optical transmission module 1000 is installed to be transferred to the optical functional element 1300 and the light emitting unit 1400. In general, in order to stably operate the optical functional element 1300 and the light emitting unit 1400, the temperature needs to be maintained in a predetermined range. However, a temperature of a peripheral environment of the optical transmission module 1000 may vary beyond the predetermined range. The temperature adjustment element 1700 operates, in such a case, in such a way as to maintain temperatures of the optical functional element 1300 and the light emitting unit 1400 in a predetermined range. At that time, as described above, when a thermal resistance between the second internal terminal 1130b and the low-frequency circuit 1320 is increased, temperatures of the optical functional element 1300 and the light emitting unit 1400 are easily maintained in a predetermined range. Further, power consumption of the temperature adjustment element 1700 can be reduced.

In contrast, the length L1 between the upper surface of the electrode of the high-frequency circuit 1310 and the upper surface of the first internal terminal 1130a is decreased because of shortening a first wire 1600a connecting the both. When the first wire 1600a connecting the high-frequency circuit 1310 and the first internal terminal 1130a is increased, impedance is increased and due to this fact, it is difficult to stably transmit a high-frequency signal. In contrast, as described above, when the wire 1600 is shortened, heat transfer from an environment to the optical functional element 1300 and the light emitting unit 1400 is increased. However, with regard to the high-frequency circuit 1310, stability of a signal is prioritized, and therefore the configuration as described above is employed.

As described above, the optical transmission module 1000 according to the first example embodiment has been described.

The optical transmission module 1000 includes the substrate 1100, the housing 1200, one or more substrates 1100a and 1100b, the optical functional element 1300, and the light emitting unit 1400. The one or more substrates 1100a and 1100b are laminated and housed inside the housing 1200 in such a way as to be partially exposed. The light emitting unit 1400 is housed in the housing 1200 and generates an optical signal. The optical functional element 1300 is housed in the housing 1200 and executes signal processing on a transmission signal that drives the light emitting unit 1400. The plurality of terminals 1110 are provided on one or more substrates (on 1100a and 1100b) in such a way as to extend between the outside and the inside of the housing 1200. The substrate 1100 includes the plurality of external terminals 1120 disposed outside the housing 1200 from among the plurality of terminals 1110 and the plurality of internal terminals 1130 disposed inside the housing 1200 from among the plurality of terminals 1110. The first group of the plurality of internal terminals 1130 is the first internal terminal 1130a connected to the electrode of the high-frequency circuit 1310 of the optical functional element 1300. The second group of the plurality of internal terminals 1130 is the second internal terminal 1130b connected to the electrode of the low-frequency circuit 1320 of the optical functional element 1300. In the direction perpendicular to the major surface of the one or more substrates 1100, the length between the upper surface of the electrode of the high-frequency circuit 1310 and the upper surface of the first internal terminal 1130*a* is less than the length between the upper surface of the electrode of the low-frequency circuit and the upper surface of the second internal terminal.

In the configuration of the optical transmission module 1000, in the direction perpendicular to the major surface of the one or more substrates 1100*a* and 1100*b*, the length L1 between the upper surface of the electrode of the high-frequency circuit 1310 and the first internal terminal 1130*a* is small, and therefore the length of the wire 1600 connecting the both can be decreased. Thereby, impedance is decreased and a high-frequency signal can be stably transmitted. In contrast, in the direction perpendicular to the major surface of the one or more substrates 1100, the length L2 between the upper surface of the electrode of the low-frequency circuit 1320 and the second internal terminal is increased. Thereby, the length of the wire 1600 connecting the both is increased. The length of the wire 1600 is long, and therefore thermal resistance is increased and an environment temperature outside the housing 1200 is unlikely to be transferred to the optical functional element 1300 and the light emitting unit 1400. As a result, temperatures of the optical functional element 1300 and the light emitting unit 1400 are easily maintained in a predetermined range.

Second Example Embodiment

Figure 6:
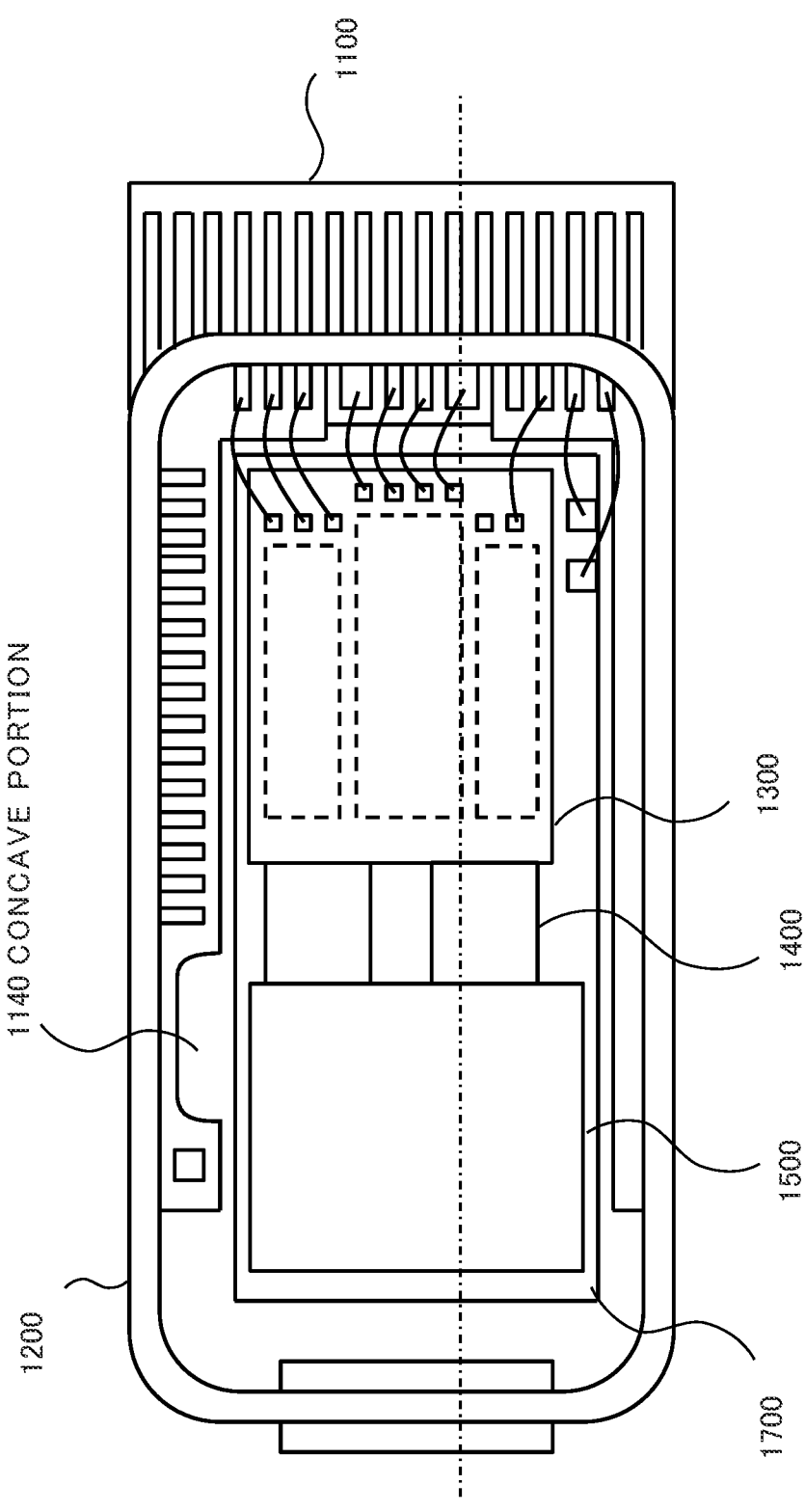
FIG. 6 is a plane schematic diagram illustrating one example of an optical transmission module according to a second example embodiment of the present invention.

FIG. 6 is a plane schematic diagram illustrating one example of an optical transmission module 1001 according to a second example embodiment of the present invention. A configuration of the optical transmission module 1001 according to the second example embodiment is substantially the same as the optical transmission module according to the first example embodiment. However, there is a difference in that a concave portion 1140 provided, in an area where a plurality of internal terminals 1130 are not provided among one or more substrates 1100, in such a way as to be separated from an electronic component (a light emitting unit 1400, an optical functional element 1300, and the like) provided inside a housing 1200 is included. The area where the concave portion 1140 is formed is larger than an area where the concave portion 1140 is not formed in a distance between the substrate 1100 to an element (an electronic component such as the light emitting unit 1400 and the optical functional element 1300) housed in the housing 1200. As a result, an environment temperature outside the optical transmission module 1000 is unlikely to be transferred to an element housed in the housing 1200, and therefore a temperature of the element (the light emitting unit 1400, the optical functional element 1300, or the like) is easily maintained in a predetermined range.

A configuration in which the concave portion 1140 is formed on the substrate 1100 is applicable without limitation to a structure in which L1 according to the first example embodiment is smaller than L2.

As described above, the optical transmission module 1001 according to the second example embodiment has been described.

The optical transmission module 1001 includes, in the area where the plurality of internal terminals 1130 are not provided among one or more substrates 1100, the concave portion provided in such a way as to be separated from the electronic component housed inside the housing 1200. By means of the concave portion 1140, the distance between the substrate 1100 and the element (the light emitting unit 1400, the optical functional element 1300, or the like) housed inside the housing 1200 is increased. As a result, an environment temperature outside the optical transmission module 1000 is unlikely to be transferred to the element housed in the housing 1200, and thereby a temperature of the element (the light emitting unit 1400, the optical functional element 1300, or the like) is easily maintained in a predetermined range. As a result, the element such as the light emitting unit 1400 and the optical functional element 1300 can be stably operated.

Third Example Embodiment

Figure 7:
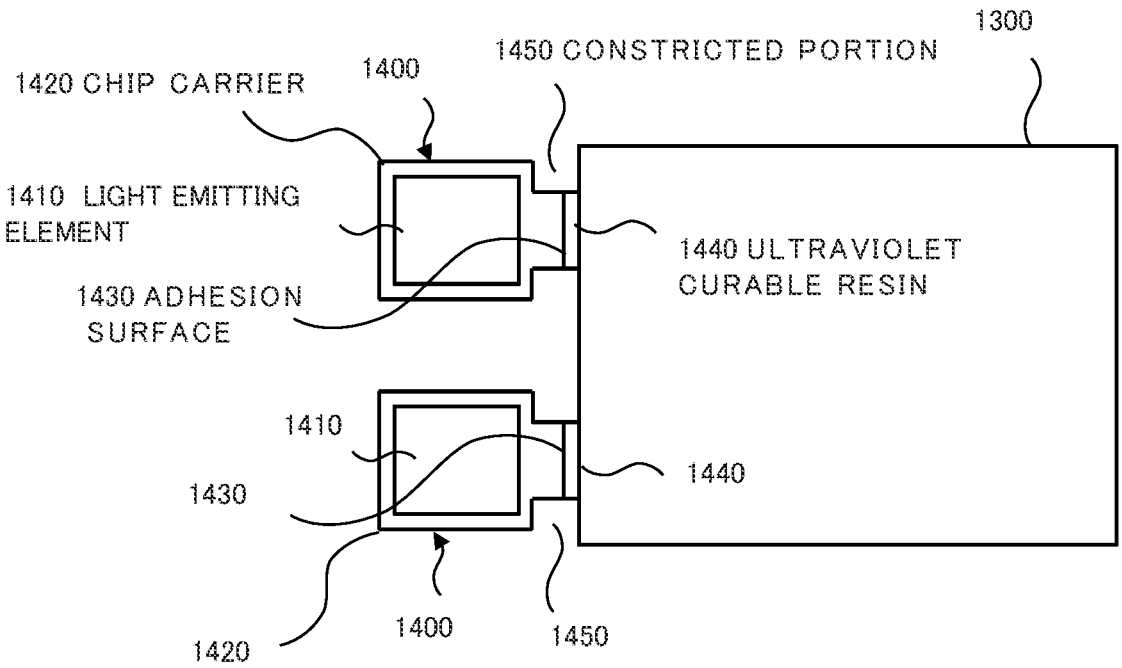
FIG. 7 is a plane schematic diagram illustrating a part of an optical transmission module according to a third example embodiment of the present invention.
Figure 8:
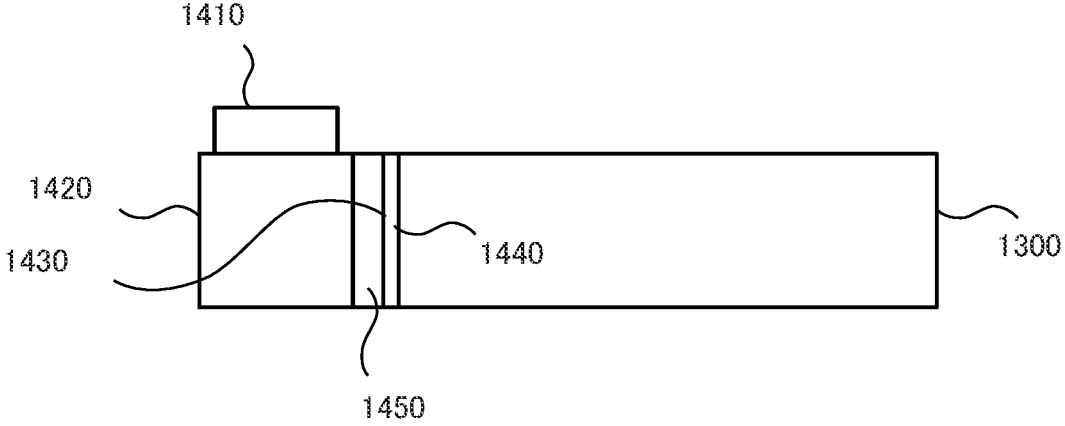
FIG. 8 is a side schematic diagram illustrating a part of the optical transmission module according to the third example embodiment of the present invention.

According to the present example embodiment, details of the optical functional element 1300 and the light emitting unit 1400 incorporated in the optical transmission module 1000 according to the first example embodiment and the optical transmission module 1001 according to the second example embodiment are described. FIG. 7 is a plane schematic diagram illustrating a part of an optical transmission module according to a third example embodiment of the present invention. FIG. 8 is a side schematic diagram illustrating a part of the optical transmission module according to the third example embodiment of the present invention.

As illustrated in FIGS. 7 and 8, in the light emitting unit 1400, a light emitting element 1410 is mounted on a block-like chip carrier 1420. The light emitting element 1410 is, for example, a laser diode. While in FIGS. 7 and 8, two light emitting elements 1410 are illustrated, three or more light emitting elements 1410 may be employed. The chip carrier 1420 and an adhesion surface 1430 of the optical functional element 1300 are caused to adhere to each other, by using an ultraviolet curable resin 1440. While not illustrated in FIG. 7 or FIG. 8, in the optical functional element 1300 and the chip carrier 1420 each, a waveguide is provided, and the waveguides are positioned and caused to adhere to each other. As illustrated in FIG. 7, in a surface of the chip carrier 1420, a constricted portion 1450 is included on a side where the adhesion surface 1430 of the chip carrier 1420 and the optical functional element 1300 is formed. The constricted portion 1450 is provided, and thereby light for curing the ultraviolet curable resin 1440 is easily reached into the ultraviolet curable resin 1440. Therefore, the chip carrier 1420 and the optical functional element 1300 are accurately positioned and thereby, can be caused to adhere to each other strongly.

The configuration in which the chip carrier 1420 includes the constricted portion 1450 is applicable, independently of the first example embodiment and the second example embodiment. In other words, when a configuration in which the chip carrier 1420 and the optical functional element 1300 are caused to adhere to each other by using the ultraviolet curable resin 1440 is available, the configuration is also applicable to another optical transmission module.

As described above, a configuration example of a part of the optical transmission module 1000 according to the third example embodiment has been described.

The light emitting unit 1400 of the optical transmission module 1000 according to the present example embodiment includes a configuration in which the light emitting element 1410 is mounted on the block-like chip carrier 1420, and the optical functional element 1300 includes a configuration in which a signal processing IC 1330 is mounted on the block-like optical functional element 1300. The chip carrier 1420 and the optical functional element 1300 are caused to adhere to each other by using the ultraviolet curable resin 1440. In a surface of the chip carrier 1420, the constricted portion 1450 is included on a side where the adhesion surface 1430 of the chip carrier 1420 and the optical functional element 1300 is formed. The constricted portion 1450 is provided for the chip carrier 1420, and thereby light for curing the ultraviolet curable resin 1440 is easily reached into the ultraviolet curable resin 1440. Therefore, the chip carrier 1420 and the optical functional element 1300 are accurately positioned and thereby, can be caused to adhere to each other strongly.

Fourth Example Embodiment

Figure 9:
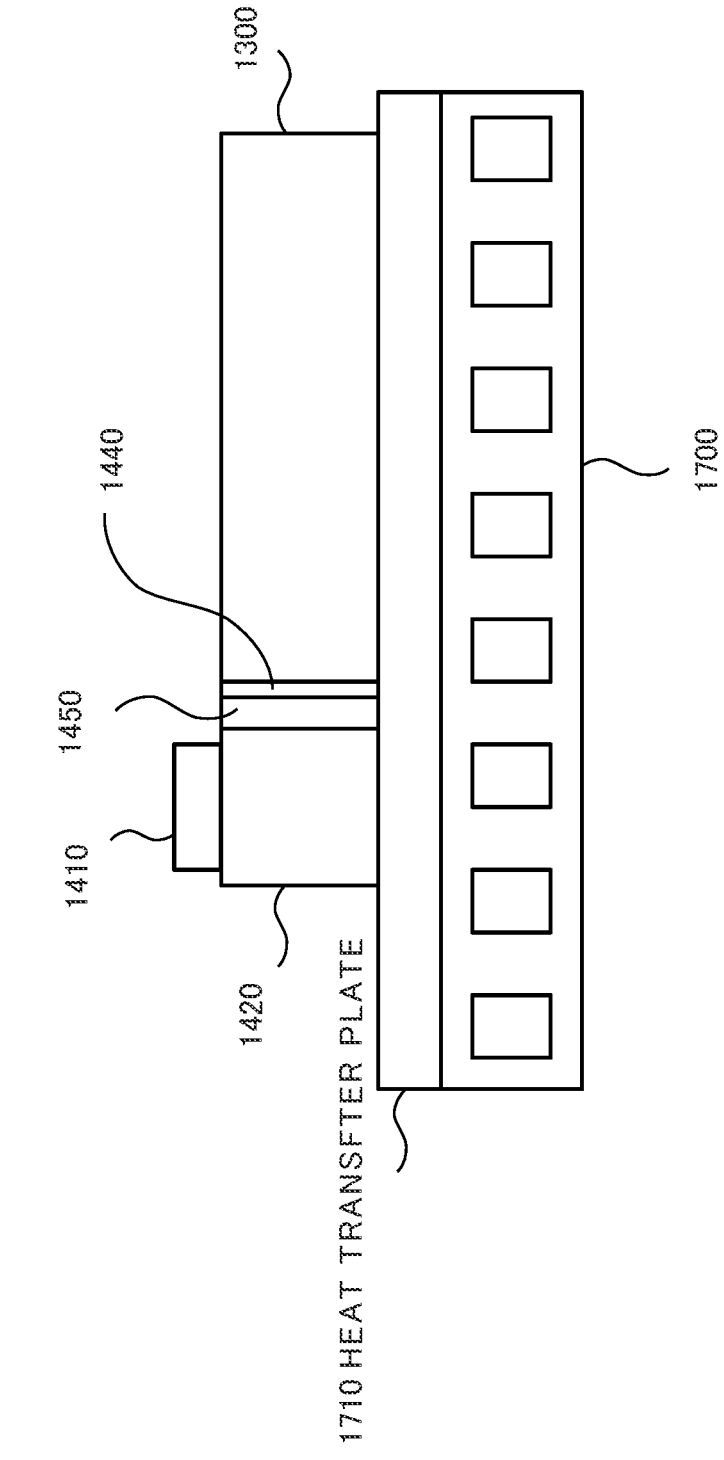
FIG. 9 is a side schematic diagram illustrating a part of an optical transmission module according to a fourth example embodiment of the present invention.

According to the present example embodiment, a configuration for performing temperature adjustment of a part of the optical transmission module according to the third example embodiment is described. FIG. 9 is a side schematic diagram illustrating a part of an optical transmission module according to a fourth example embodiment of the present invention. As illustrated in FIG. 9, an optical transmission module 1000 according to the present example embodiment includes a heat transfer plate 1710 between an optical functional element 1300 as well as a chip carrier 1420 and a temperature adjustment element 1700.

The heat transfer plate 1710 is provided inside a housing 1200 and is attached with the chip carrier 1420 and the optical functional element 1300.

The temperature adjustment element 1700 is provided inside the housing 1200 and attached with the heat transfer plate 1710, and adjusts a temperature of the heat transfer plate 1710.

An area of the heat transfer plate is larger than an area of a surface where the chip carrier and the optical functional element make contact with the heat transfer plate.

Herein, the chip carrier 1420 and the optical functional element 1300 are thermally connected to the temperature adjustment element 1700 via the heat transfer plate 1710. An area of the heat transfer plate 1710 is larger than an area of a surface where the chip carrier 1420 and the optical functional element 1300 make contact with the heat transfer plate 1710.

The temperature adjustment element 1700 is generally referred to, for example, as a thermos-electric cooler (TEC) and controls temperature, based on an electric operation. As described above, the area of the heat transfer plate 1710 is larger than the area of a surface where the chip carrier 1420 and the optical functional element 1300 make contact with the heat transfer plate 1710. As a material of the heat transfer plate 1710, for example, aluminum nitride, copper alloy, and the like can be used. When such a heat transfer plate 1710 is used, heat transfer in a direction along a bottom surface of the chip carrier 1420 and the optical functional element 1300 is increased, and thereby temperature adjustment by means of the temperature adjustment element 1700 is made easy.

The configuration in which the heat transfer plate 1710 is provided is applicable, independently of a configuration in which the chip carrier 1420 and the optical functional element 1300 are caused to adhere to each other by using an ultraviolet curable resin 1440 as described according to the third example embodiment. In other words, a configuration in which at least either of the chip carrier 1420 and the optical functional element 1300 is connected to the temperature adjustment element 1700 via the heat transfer plate 1710 having an area larger than a local bottom surface is made possible. A configuration in which without limitation to the chip carrier 1420 and the optical functional element 1300, another element configuring the optical transmission module 1000 is brought into contact with the heat transfer plate 1710 having an area larger than a local bottom surface is also employable.

As described above, a configuration of a part of the optical transmission module according to the fourth example embodiment has been described.

The optical transmission module 1000 according to the present example embodiment includes the heat transfer plate 1710 and the temperature adjustment element 1700. The heat transfer plate 1710 is provided inside the housing 1200 and attached with the chip carrier 1420 and the optical functional element 1300. The temperature adjustment element 1700 is provided inside the housing 1200 and attached with the heat transfer plate 1710, and adjusts a temperature of the heat transfer plate 1710. The chip carrier 1420 and the optical functional element 1300 are thermally connected to the temperature adjustment element via the heat transfer plate 1710. The area of the heat transfer plate 1710 is larger than the area of a surface where the chip carrier 1420 and the optical functional element 1300 make contact with the heat transfer plate 1710. When such a heat transfer plate 1710 is used, heat transfer in the direction along the bottom surface of the chip carrier 1420 and the optical functional element 1300 is increased, and thereby temperature adjustment by means of the temperature adjustment element 1700 is made easy.

Fifth Example Embodiment

Figure 10:
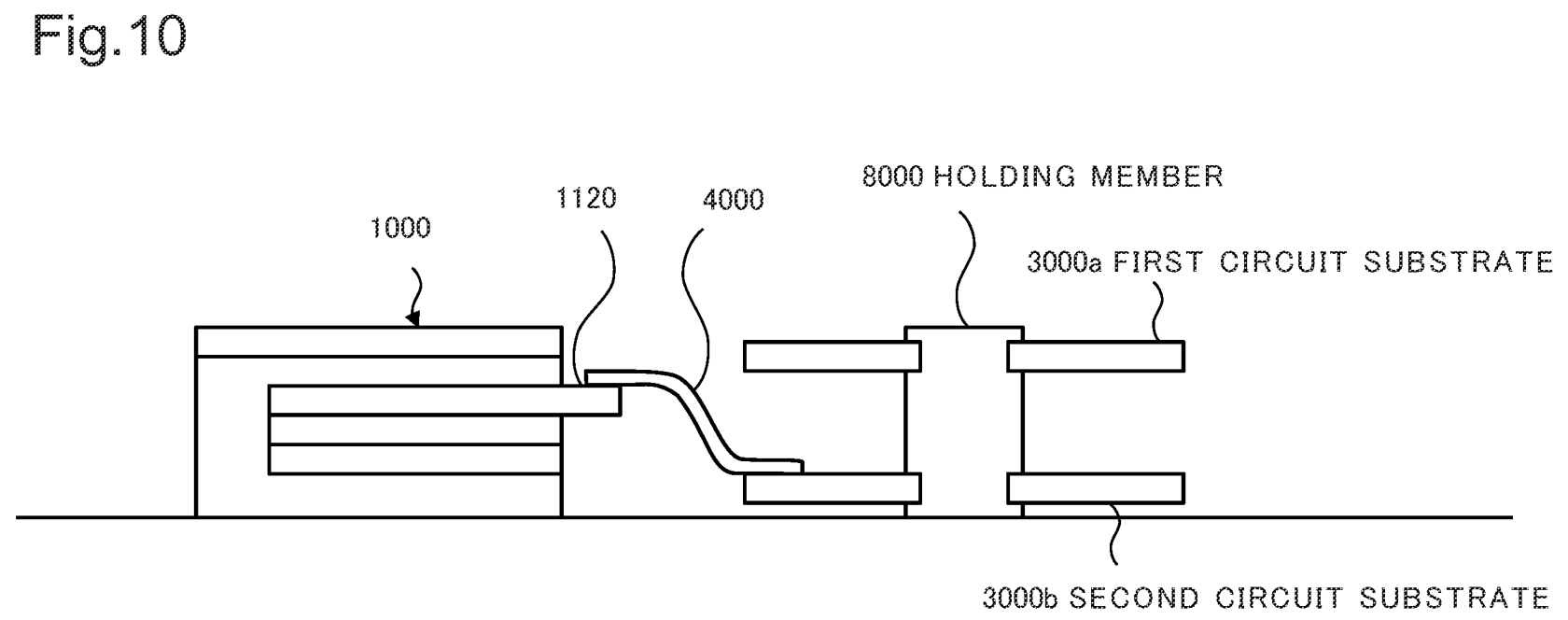
Figure 11:
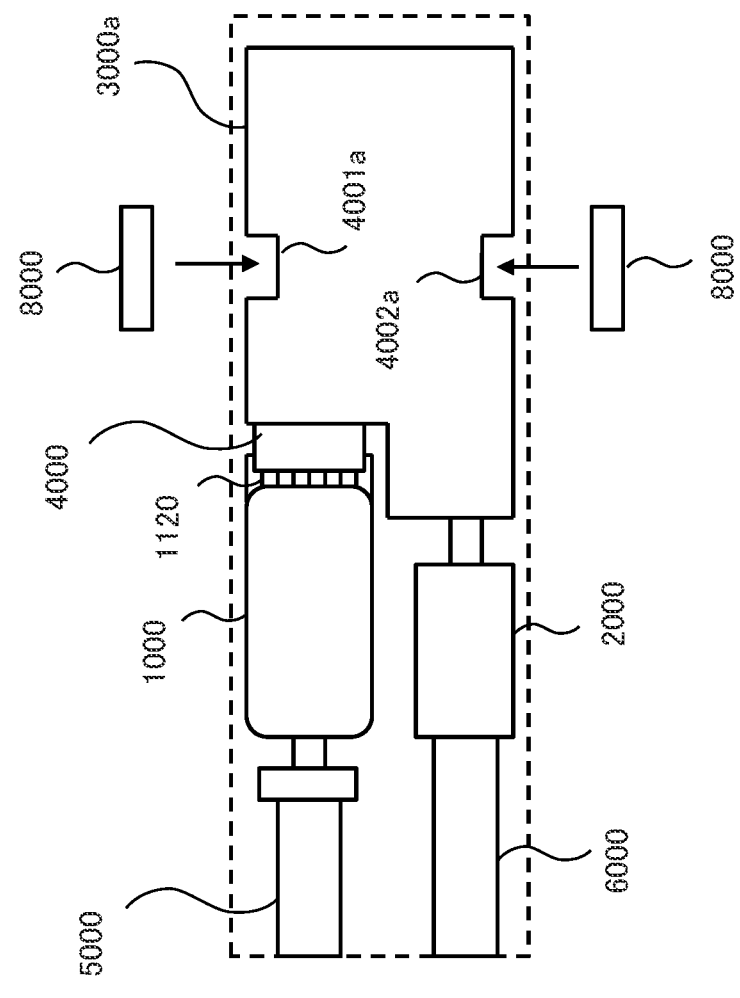
FIG. 11 is a plane exploded diagram illustrating one example the optical module according to the fifth example embodiment of the present invention.
Figure 12:
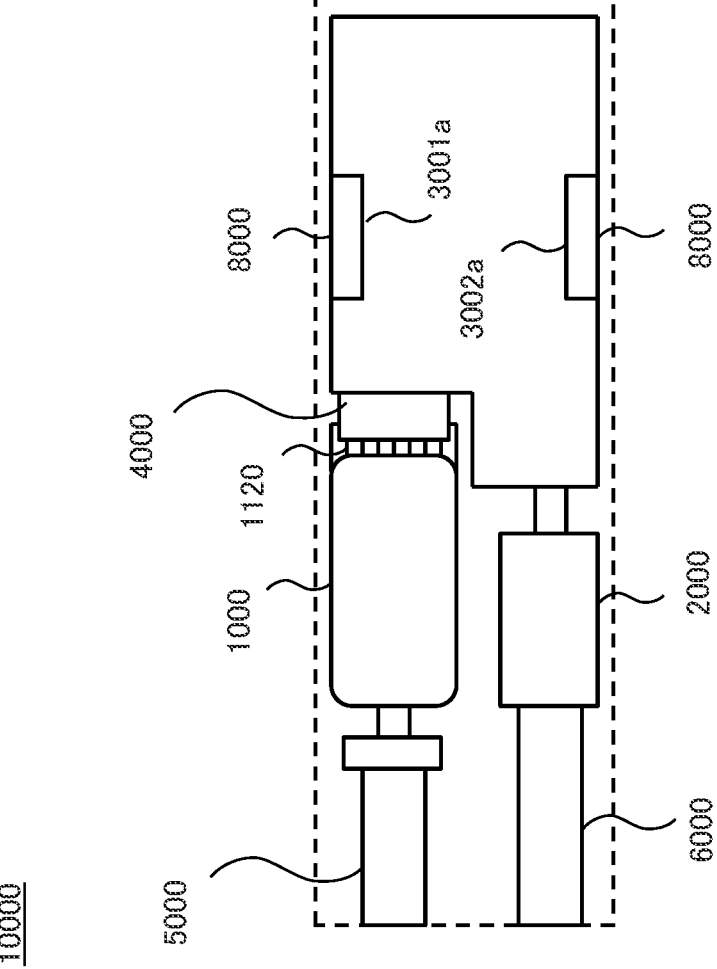
FIG. 12 is a plane exploded diagram illustrating one example the optical module according to the fifth example embodiment of the present invention.

According to the present example embodiment, a configuration example of the circuit substrate 3000 connected with the optical transmission module 1000 and the flexible substrate 4000 in the optical module 10000 of FIG. 2 is described. FIG. 10 is a side schematic diagram illustrating a configuration example of an optical module according to a fifth example embodiment of the present invention. FIG. 11 is a plane exploded diagram illustrating one example the optical module according to the fifth example embodiment of the present invention. FIG. 12 is a plane exploded diagram illustrating one example the optical module according to the fifth example embodiment of the present invention.

The circuit substrate 3000 includes a first circuit substrate 3000a and a second circuit substrate 3000b. In the following description, while an example in which there are two circuit substrates 3000 is described, the description is similarly applicable to a case of three or more circuit substrates.

The circuit substrate 3000 includes the first circuit substrate 3000a and the second circuit substrate 3000b disposed in an overlapping manner with a gap between major surfaces of these substrates. An external terminal 1120 of an optical transmission module 1000 and the second circuit substrate 3000b are electrically connected by a flexible substrate 4000. A holding member 8000 that is attached to a side end of a plurality of the circuit substrates 3000 and holds each of the plurality of circuit substrates 3000 by separating the major surfaces of the plurality of circuit substrates 3000 is included.

As illustrated in FIG. 11, in the first circuit substrate 3000a, notch portions 3001a and 3002a in which the holding member 8000 is fitted are provided. The holding member 8000 is fitted in the notch portions 3001a and 3002a each from an outside of a side end, and thereby the state in FIG. 12 is achieved.

When the configuration as described above is made, a major surface of the first circuit substrate 3000a and a major surface of the second circuit substrate 3000b can be disposed in such a way as to be overlapped with each other with a predetermined gap. At that time, the holding member 8000 is disposed in a side end of the first circuit substrates 3000a and 4000b, and therefore an area where a component of the first circuit substrate 3000a and 4000b is mounted can be widely ensured.

The configuration is also applicable to an optical module including an optical transmission module other than the optical transmission modules 1000 and 1001 according to the first to fourth example embodiments. The optical module in this case may include an optical transmission module, a terminal thereof, a plurality of circuit substrates, and a flexible substrate connecting a terminal and at least one circuit substrate.

As described above, a configuration of a part of the optical module according to the fifth example embodiment has been described.

A part of the optical module 10000 according to the present example embodiment includes the plurality of circuit substrates 3000 in which the major surfaces of the plurality of circuit substrates 3000 are disposed in an overlapping manner with a gap and the flexible substrate that electrically connects the external terminal 1120 of the optical transmission module 1000 and at least one of the plurality of circuit substrates. Further, the holding member 8000 that is attached to the side end of the plurality of circuit substrate 3000 and holds each of the plurality of circuit substrate 3000 by separating the major surfaces of the plurality of circuit substrates 3000 is included. In the configuration, the holding member 8000 is disposed in the side end of the circuit substrate 3000, and therefore in the circuit substrate 3000, the area where a component is mounted can be widely ensured.

Further, at least one of the plurality of circuit substrates 3000 in the optical module 10000 includes the notch portions 3001a and 3002a in which the holding member 8000 is fitted. The notch portions 3001a and 3002a are provided and the holding member 8000 is fitted therein, and therefore the holding member 8000 can be stably held.

Sixth Example Embodiment

Figure 13:
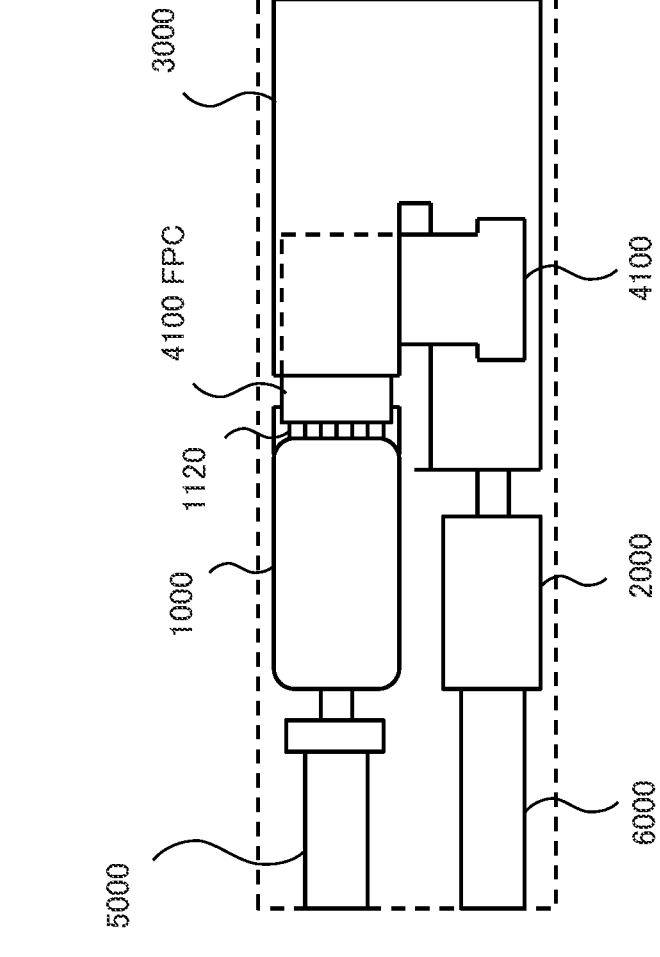
FIG. 13 is a plane schematic diagram illustrating one example an optical module according to a sixth example embodiment of the present invention.

According to the present example embodiment, a flexible substrate 4100 which is a modified example of the flexible substrate 4000 that connects the external terminal 1120 of the optical transmission module 1000 and the flexible substrate 4000 is described. FIG. 13 is a plane schematic diagram illustrating one example an optical module according to a sixth example embodiment of the present invention. The flexible substrate 4100 is disposed in such a way that a plurality of first terminals arranged in one end and a plurality of second terminals arranged in the other end are orthogonal to each other. A circuit substrate 3000 has a shape in which the flexible substrate 4100 can pass from one major surface to the other major surface of the circuit substrate 3000. When such a configuration is made, a connection portion between the circuit substrate 3000 and the flexible substrate 4100 can be disposed, for example, on an uppermost surface of the optical module 10000. Thereby, work, for example, such as welding for connection can be made easy.

The configuration is also applicable to an optical module including an optical transmission module other than the optical transmission modules 1000 and 1001 according to the first to fourth example embodiments and an optical module other than the fifth example embodiment. The optical module in this case may include an optical transmission module, a terminal thereof, a circuit substrate, and a flexible substrate connecting a terminal and a circuit substrate.

As described above, a configuration example of the optical module 10000 according to the sixth example embodiment has been described.

The optical module 10000 is disposed in such a way that the plurality of first terminals arranged in one end of the flexible substrate 4000 and the plurality of second terminals arranged in the other end of the flexible substrate 4000 are orthogonal to each other. When the flexible substrate of such a configuration is used, a degree of freedom of layout at a time of connecting the flexible substrate 4000 and the circuit substrate 3000 is increased and, for example, a configuration in which workability of connection work is excellent is selectable.

Seventh Example Embodiment

Figure 14:
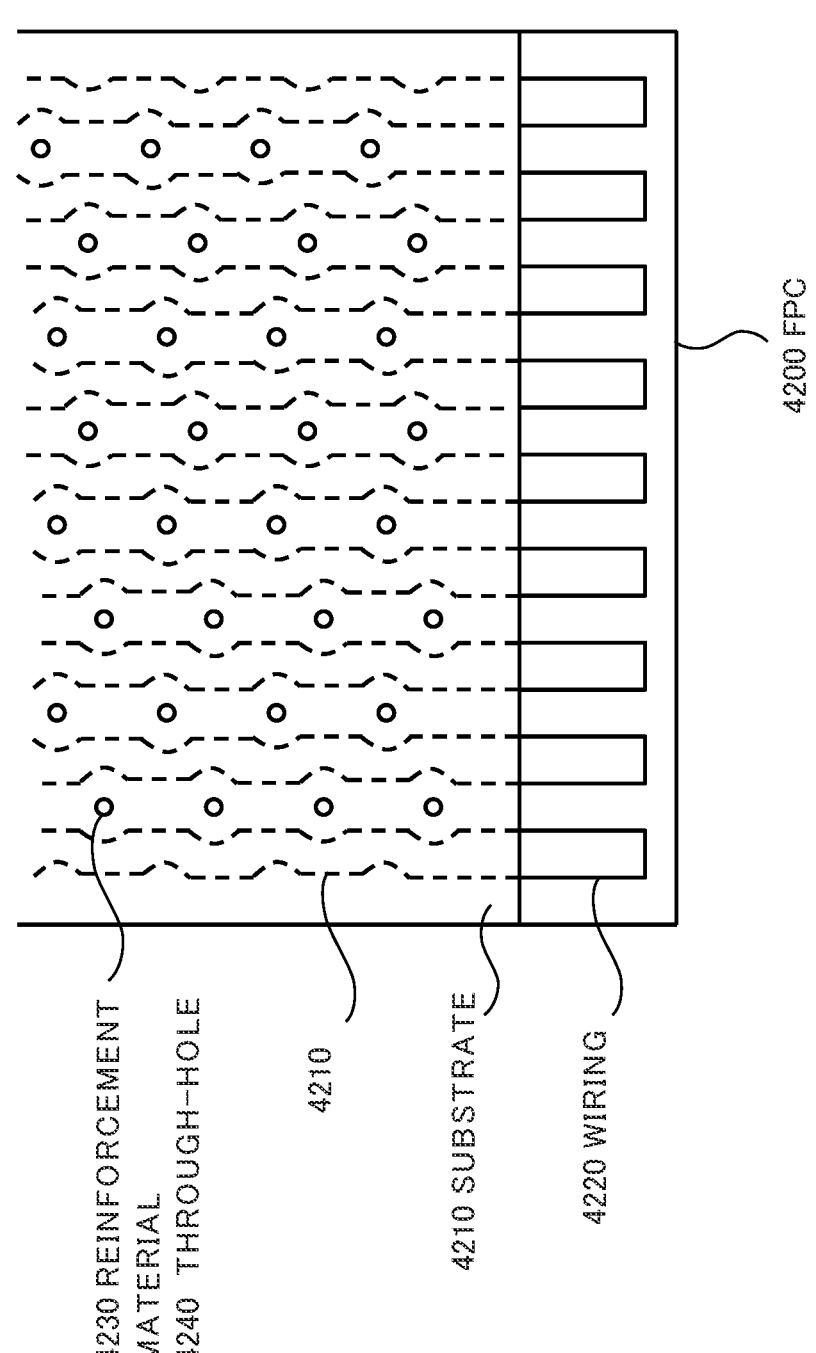
FIG. 14 is a plane schematic diagram illustrating one example of a flexible substrate used in an optical module according to a seventh example embodiment of the present invention.

According to the present example embodiment, a modified example of the flexible substrate 4000 used according to the fifth and sixth example embodiments is described. FIG. 14 is a plane illustrating one example of a flexible substrate used in an optical module according to a seventh example embodiment of the present invention. A flexible substrate 4200 according to the present example embodiment includes a configuration in which a plurality of wirings 4220 are arranged in parallel in a substrate 4210. The flexible substrate 4200 includes a plurality of through-holes 4240 between wirings adjacent to each other and a plurality of reinforcement materials 4230 filled in each of the plurality of through-holes 4240, and a plurality of reinforcement materials 4230 are arranged in a zigzag manner. Each wiring 4220 is not linear but has a meander shape in such a way that a distance to each reinforcement material 4230 is increased by a predetermined value or more.

The reinforcement material 4230 is, for example, metal or the like filled in the through-hole 4240 provided on the substrate 4210 between the wirings 4220. The reinforcement material 4230 is provided, and thereby mechanical strength such as shear strength and tensile strength of the flexible substrate 4200 can be increased. When the reinforcement material 4230 is arranged in a meander manner, the reinforcement material 4230 can be disposed at a higher density per unit area than when the reinforcement material 4230 is linearly arranged. Therefore, mechanical strength can be increased, compared with when the reinforcement material 4230 is linearly arranged.

The configuration is also applicable to an optical module including an optical transmission module other than the optical transmission modules 1000 and 1001 according to the first to fourth example embodiments and an optical module other than the fifth and sixth example embodiments. The optical module in this case may include an optical transmission module, a terminal thereof, a circuit substrate, and a flexible substrate connecting a terminal and a circuit substrate.

As described above, one example of the flexible substrate 4200 used in the optical module according to the seventh example embodiment has been described. The flexible substrate 4200 includes the plurality of through-holes 4240 between the wirings adjacent to each other and the plurality of reinforcement materials 4230 filled in each of the plurality of through-holes 4240. The plurality of reinforcement materials 4230 are arranged in a meander manner. In this manner, when meander-like disposition is employed, the reinforcement material 4230 can be arranged at a high density per unit area. Therefore, mechanical strength can be increased more than in a case of a linear arrangement.

The whole or part of the example embodiments disclosed above can be described as, but not limited to, the following Supplementary notes.

Supplementary Note 1

An optical transmission module including:

a housing;

one or more substrates that are laminated and housed inside the housing in such a way as to be partially exposed;

a light emitting unit that is housed in the housing and generates an optical signal;

an optical functional element that is housed in the housing and executes signal processing on a transmission signal that drives the light emitting unit;

a plurality of terminals provided on the one or more substrates in such a way as to extend between an outside and an inside of the housing;

a plurality of external terminals disposed outside the housing from among the plurality of terminals; and a plurality of internal terminals disposed inside the housing from among the plurality of terminals, in which a first group of the plurality of internal terminals is a first internal terminal connected to an electrode of a high-frequency circuit of the optical functional element, a second group of the plurality of internal terminals is a second internal terminal connected to an electrode of a low-frequency circuit of the optical functional element, and, in a direction perpendicular to a major surface of the one or more substrates, a length between an upper surface of the electrode of the high-frequency circuit and an upper surface of the first internal terminal is less than a length between an upper surface of the electrode of the low-frequency circuit and an upper surface of the second internal terminal.

Supplementary Note 2

The optical transmission module according to Supplementary note 1, further including a concave portion provided in an area where the plurality of internal terminals are not provided among the one or more substrates in such a way as to be separated from an electronic component provided inside the housing.

Supplementary Note 3

The optical transmission module according to Supplementary note 1 or 2, in which the electrode of the high-frequency circuit and the first internal terminal are connected by a wire, and the electrode of the low-frequency circuit and the second internal terminal are connected by a wire.

Supplementary Note 4

The optical transmission module according to any one of Supplementary notes 1 to 3, in which the light emitting unit includes a configuration in which a block-like chip carrier is mounted with a light emitting element, the chip carrier and the optical functional element are caused to adhere to each other, by using an ultraviolet curable resin, and, in a surface of the chip carrier, a constricted portion is included on a side where an adhesion surface of the chip carrier and the optical functional element is formed.

Supplementary Note 5

The optical transmission module according to Supplementary note 4, further including:

a heat transfer plate that is provided inside the housing and attached with the chip carrier and the optical functional element; and a temperature adjustment element that is provided inside the housing, is attached with the heat transfer plate and adjusts a temperature of the heat transfer plate, in which the chip carrier and the optical functional element are thermally connected to the temperature adjustment element via the heat transfer plate, and an area of the heat transfer plate is larger than an area of a surface where the chip carrier and the optical functional element make contact with the heat transfer plate.

Supplementary Note 6

An optical module including:

the optical transmission module according to any one of Supplementary notes 1 to 5;

a plurality of circuit substrates in which major surfaces of the circuit substrates are disposed in an overlapping manner with a gap;

a flexible substrate that electrically connects the external terminal of the optical transmission module and at least one of the plurality of circuit substrates; and a holding member that is attached to a side end of the plurality of circuit substrates and holds each of the plurality of circuit substrates by separating the major surfaces of the plurality of circuit substrates.

Supplementary Note 7

The optical module according to Supplementary note 6, in which at least one of the plurality of circuit substrates includes a notch portion in which the holding member is fitted.

Supplementary Note 8

The optical module according to Supplementary note 6 or 7, in which a plurality of first terminals arranged in one end of the flexible substrate and a plurality of second terminals arranged in another end of the flexible substrate are disposed in such a way as to be orthogonal to each other.

Supplementary Note 9

The optical module according to any one of Supplementary notes 6 to 8, in which the flexible substrate includes a plurality of through-holes between wirings adjacent to each other and a plurality of reinforcement materials filled in each of the plurality of through-holes, and the plurality of reinforcement materials are arranged in a meander manner.

Supplementary Note 10

An optical transmission module including:

a housing;

one or more substrates that are laminated and housed inside the housing in such a way as to be partially exposed;

a light emitting unit that is housed in the housing and generates an optical signal;

an optical functional element that is housed in the housing and executes signal processing on a transmission signal that drives the light emitting unit;

a plurality of terminals provided on the one or more substrates in such a way as to extend between an outside and an inside of the housing;

a plurality of external terminals disposed outside the housing from among the plurality of terminals; and a plurality of internal terminals disposed inside the housing from among the plurality of terminals, in which a first group of the plurality of internal terminals is a first internal terminal connected to an electrode of a high-frequency circuit of the optical functional element, a second group of the plurality of internal terminals is a second internal terminal connected to an electrode of a low-frequency circuit of the optical functional element, and a concave portion provided in an area where the plurality of internal terminals are not provided among the one or more substrates in such a way as to be separated from an electronic component provided inside the housing is included.

Supplementary Note 11

An optical transmission module including:

a light emitting unit that outputs light for transmitting an optical signal; and an optical functional element that controls the light emitting unit, in which the light emitting unit includes a configuration in which a light emitting element is mounted on a block-like chip carrier, the chip carrier and the optical functional element are caused to adhere to each other by using an ultraviolet curable resin, and, in a surface of the chip carrier, a constricted portion is provided on a side where an adhesion surface of the chip carrier and the optical functional element is formed.

Supplementary Note 12

An optical module including:

an optical transmission module that transmits an optical signal;

a plurality of circuit substrates in which major surfaces of the circuit substrates are disposed in an overlapping manner with a gap;

a flexible substrate that electrically connects the external terminal of the optical transmission module and at least one of a plurality of the circuit substrates; and a holding member that holds each of a plurality of the circuit substrates by separating the major surfaces of the plurality of circuit substrates.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

1 Optical transceiver
2 Housing
3 Connector
1000, 1001 Optical transmission module
1100 Substrate
1110 Terminal
1120 External terminal
1130 Internal terminal
1140 Concave portion
1200 Housing
1300 Optical functional element
1310 High-frequency circuit
1320 Low-frequency circuit
1400 Light emitting unit
1600 Wire
1700 Temperature adjustment element
1710 Heat transfer plate
2000 Optical reception module
3000 Circuit substrate
4000 Flexible substrate
5000 Transmission-side sleeve
6000 Reception-side sleeve
8000 Holding member
10000 Optical module

What is claimed is:

1. An optical transmission module comprising:

a housing;

one or more substrates that are laminated and housed inside the housing in such a way as to be partially exposed;

a light emitter that is housed in the housing and generates an optical signal;

an optical functional element that is housed in the housing and executes signal processing on a transmission signal that drives the light emitter;

a plurality of terminals provided on the one or more substrates in such a way as to extend between an outside and an inside of the housing;

a plurality of external terminals disposed outside the housing from among the plurality of terminals; and a plurality of internal terminals disposed inside the housing from among the plurality of terminals, wherein a first group of the plurality of internal terminals is a first internal terminal connected to an electrode of a high-frequency circuit of the optical functional element, a second group of the plurality of internal terminals is a second internal terminal connected to an electrode of a low-frequency circuit of the optical functional element, and, in a direction perpendicular to a major surface of the one or more substrates, a length between an upper surface of the electrode of the high-frequency circuit and an upper surface of the first internal terminal is less than a length between an upper surface of the electrode of the low-frequency circuit and an upper surface of the second internal terminal.

2. The optical transmission module according to claim 1, further comprising a concave portion provided in an area where the plurality of internal terminals are not provided among the one or more substrates in such a way as to be separated from an electronic component provided inside the housing.

3. The optical transmission module according to claim 1, wherein the electrode of the high-frequency circuit and the first internal terminal are connected by a wire, and the electrode of the low-frequency circuit and the second internal terminal are connected by a wire.

4. The optical transmission module according to claim 1, wherein the light emitter includes a configuration in which a block-like chip carrier is mounted with a light emitting element, the chip carrier and the optical functional element are caused to adhere to each other, by using an ultraviolet curable resin, and, in a surface of the chip carrier, a constricted portion is included on a side where an adhesion surface of the chip carrier and the optical functional element is formed.

5. The optical transmission module according to claim 4, further comprising:

a heat transfer plate that is provided inside the housing and attached with the chip carrier and the optical functional element; and a temperature adjustment element that is provided inside the housing, is attached with the heat transfer plate, and adjusts a temperature of the heat transfer plate, wherein the chip carrier and the optical functional element are thermally connected to the temperature adjustment element via the heat transfer plate, and an area of the heat transfer plate is larger than an area of a surface where the chip carrier and the optical functional element make contact with the heat transfer plate.

6. An optical module comprising:

the optical transmission module according to claim 1;

a plurality of circuit substrates in which major surfaces of the circuit substrates are disposed in an overlapping manner with a gap;

a flexible substrate that electrically connects the external terminal of the optical transmission module and at least one of the plurality of circuit substrates; and a holding member that is attached to a side end of the plurality of circuit substrates and holds each of the plurality of circuit substrates by separating the major surfaces of the plurality of circuit substrates.

7. The optical module according to claim 6, wherein at least one of the plurality of circuit substrates includes a notch portion in which the holding member is fitted.

8. The optical module according to claim 6, wherein a plurality of first terminals arranged in one end of the flexible substrate and a plurality of second terminals arranged in another end of the flexible substrate are disposed in such a way as to be orthogonal to each other.

9. The optical module according to claim 6, wherein the flexible substrate includes a plurality of through-holes between wirings adjacent to each other and a plurality of reinforcement materials filled in each of the plurality of through-holes, and the plurality of reinforcement materials are arranged in a meander manner.

\* \* \* \* \*